INVENTORS.
HASKIN U. DEELEY, Jr
GEORGE H. STRAM

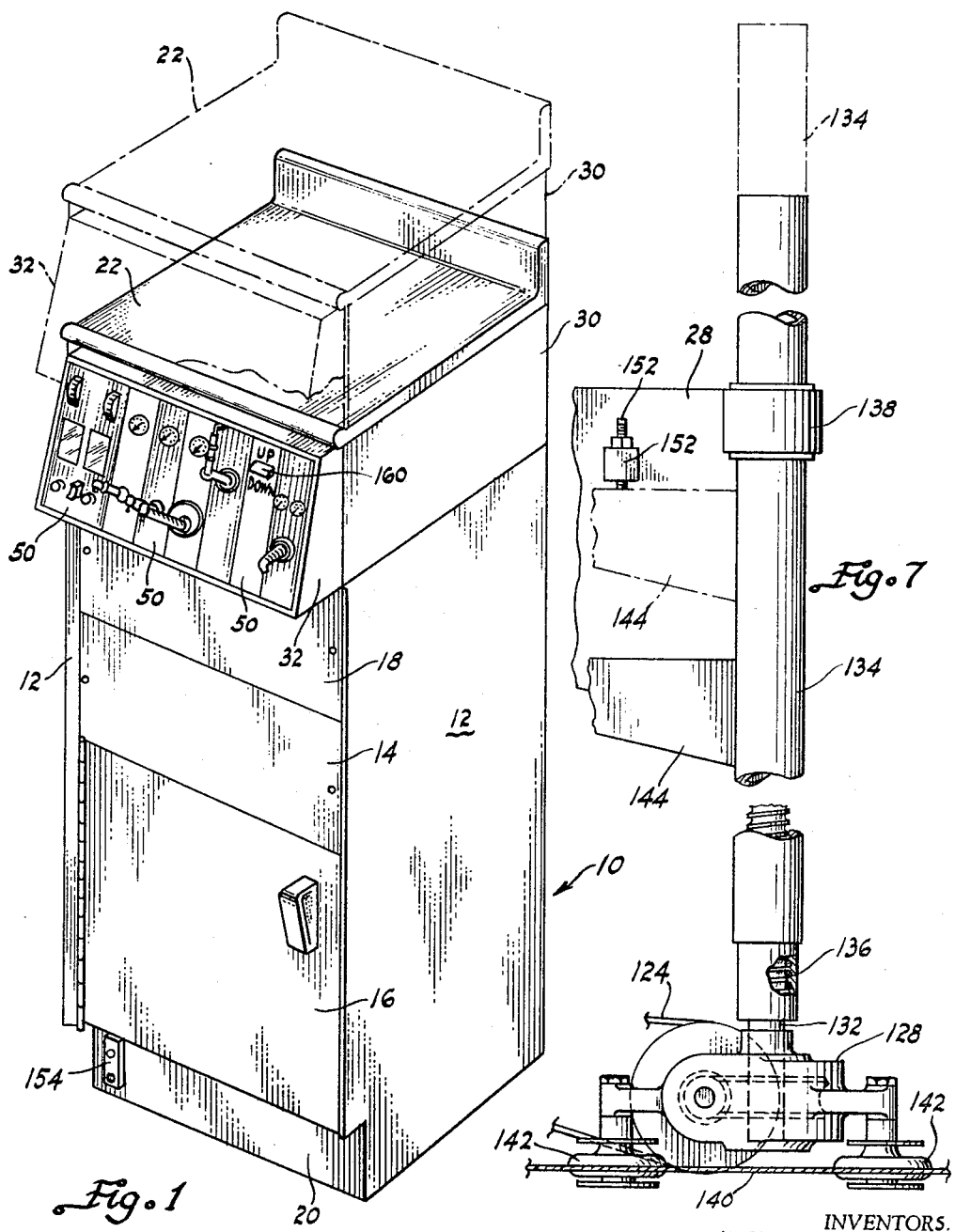

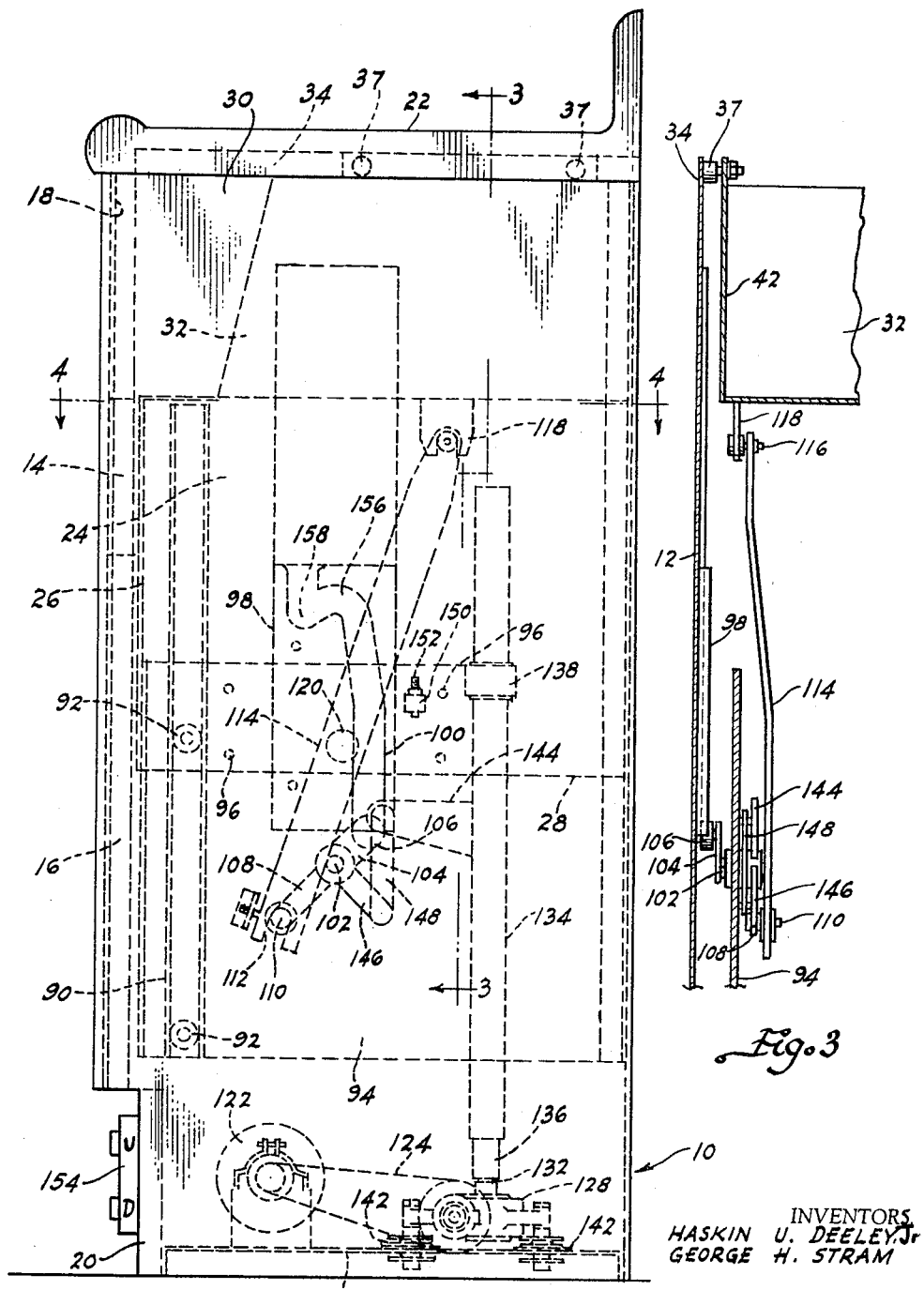

ATTORNEY

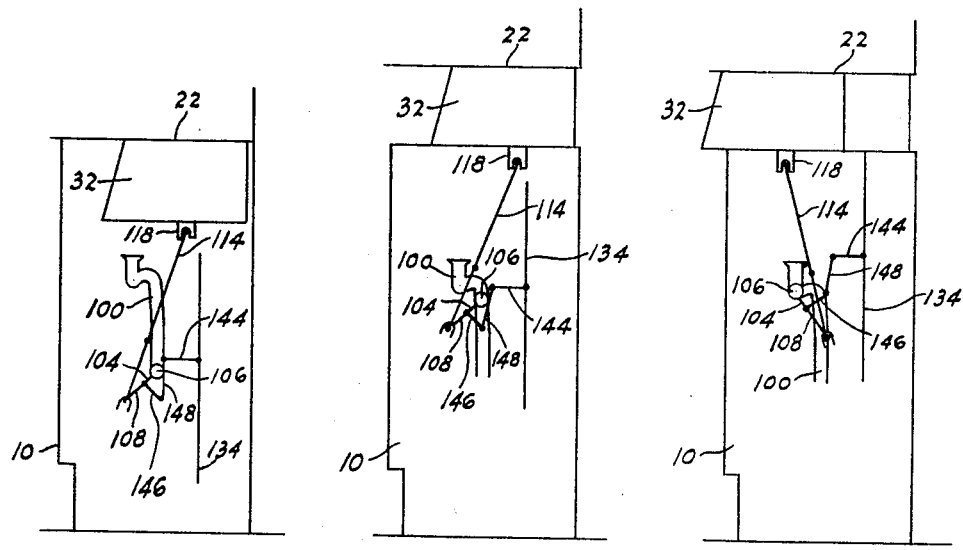
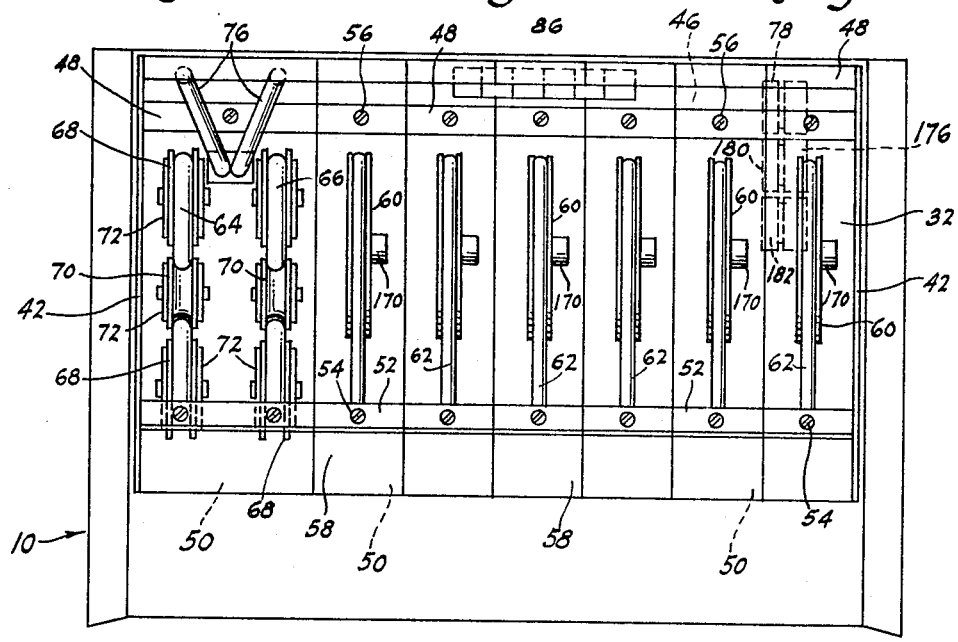

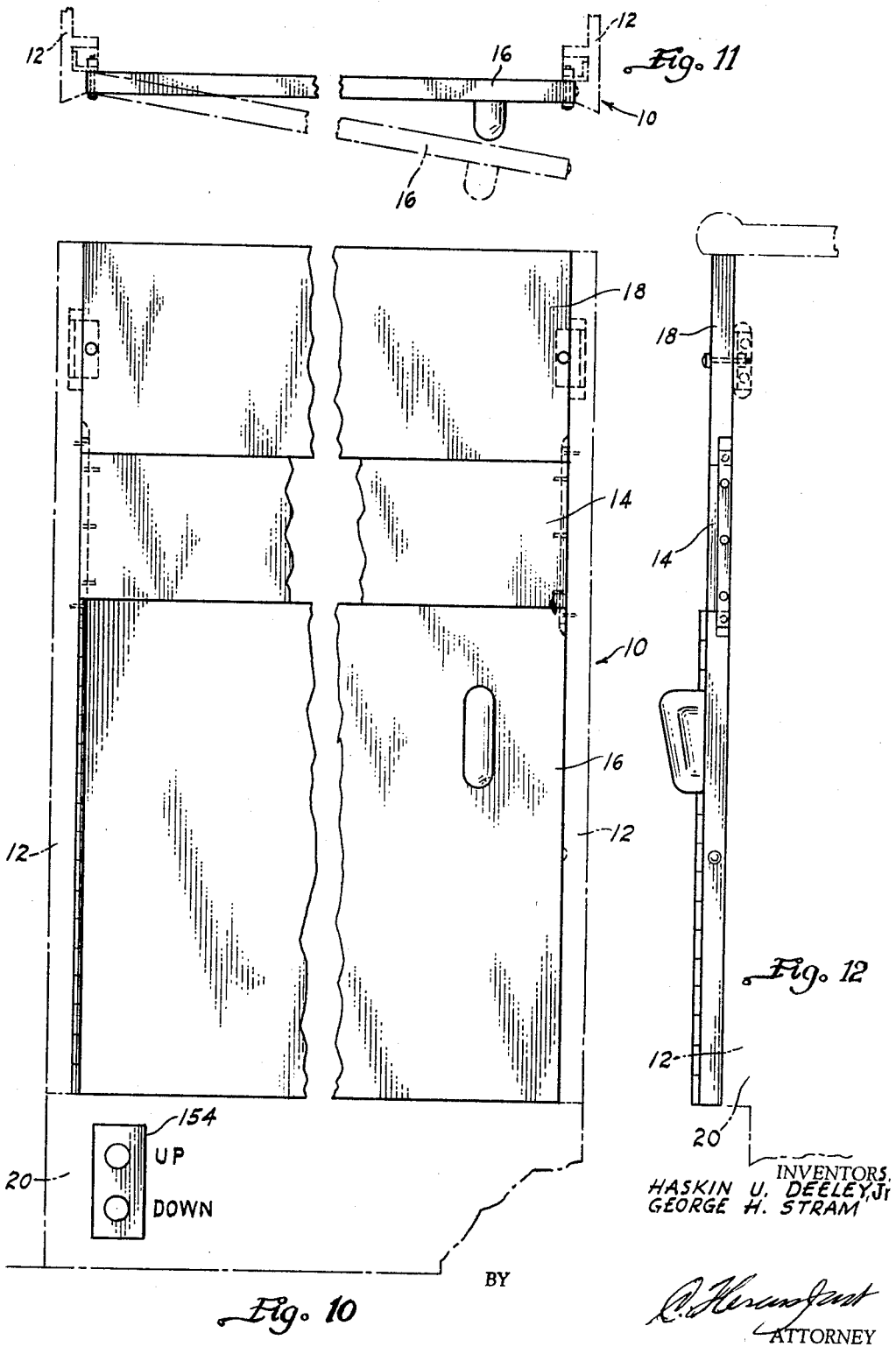

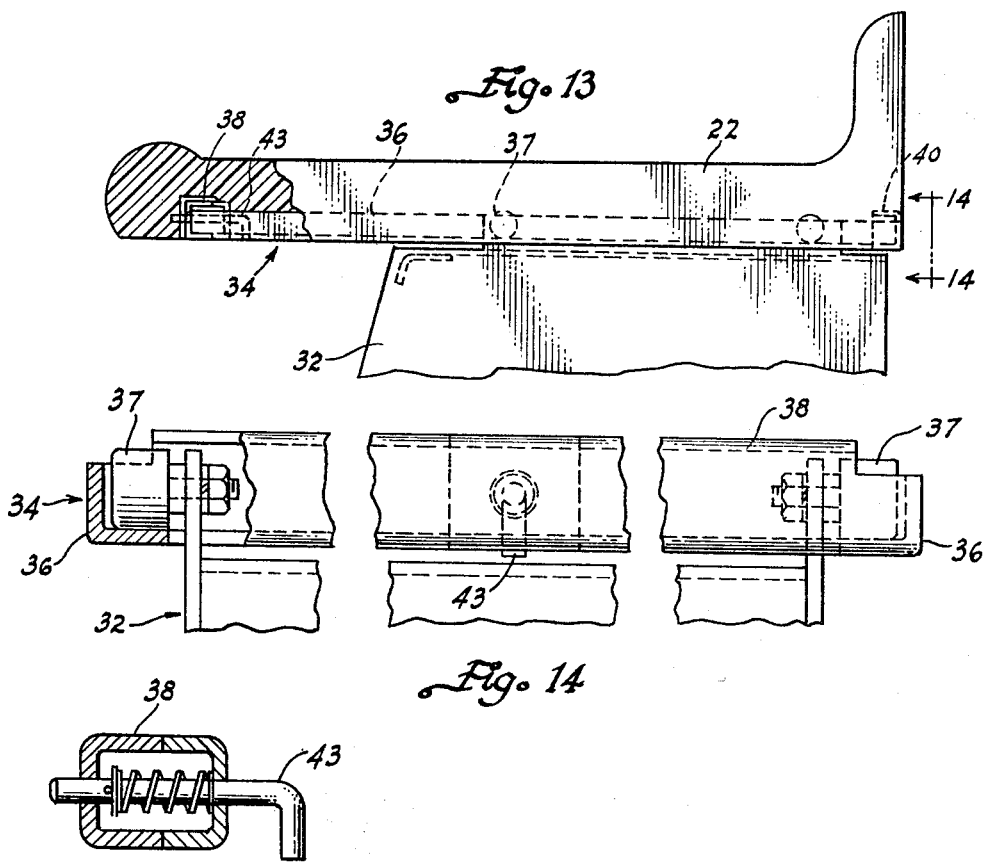
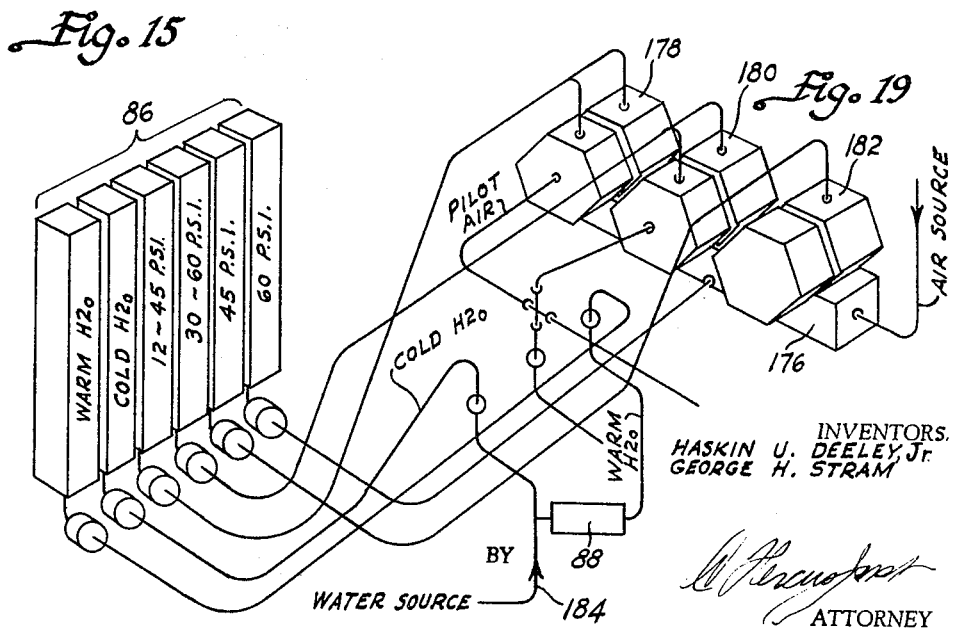

United States Patent Office 3,280,458
Patented Oct. 25, 1966

3,280,458
DENTAL EQUIPMENT STAND
Haskin U. Deeley, Jr., Baltimore, Md., and George H. Stram, Hellam, Pa., assignors to The Dentists' Supply Company of New York, York, Pa., a corporation of New York
Filed Dec. 19, 1963, Ser. No. 331,788
26 Claims. (Cl. 32—22)

This invention relates to a dental equipment stand, and, more particularly, a dental equipment stand of the type arranged to hold and readily position in operative arrangement a substantial number of different types of dental instruments, mostly of the hand type which require power of some sort and are connected to a source thereof by tubing or cord so as readily to be used by a dentist in various kinds of dental operations, treatments and functions.

For many years, it has been customary for a dental office or operatory to have a dental stand comprising a post-like supporting member extending vertically from the floor, adjacent a dental chair, and having various laterally extending arms, usually of different lengths, and respectively holding an operating tray upon which unattached dental hand instruments are supported for ready access, and a dental cuspidor. Supported by the upper portion of the vertical post-like supporting member is a customary battery of a limited number of dental instruments connected to cords or tubes, usually three or four, particularly comprising air and water syringes, high speed handpieces and possibly a pulp tester and a dental exploratory light also are carried by said upper portion of the vertical member, adjacent the syringes.

Also supported by the upper portion of such vertical support is an arrangement of pivoted arms supporting an electrically driven dental engine and the outer end of said assembly of arms supports a dental handpiece of the belt-driven type. This, in general, is and has been the well-known arrangement of dental stands for many years. Even the recent advent of the air-turbine type handpiece has not changed the overall arrangement very much, except to add a more simplified type of vertical support from the upper end of which the air-tube for the air-turbine type handpieces extends.

Additional customary items normally found in a dentist's office or operatory for many years is the usual cabinet comprising tiers of drawers within which the dentist stores his various instruments, supplies, and accessory materials and items. Usually a wash basin is present in one corner of the operatory and, along another wall, a rather formidable appearing X-ray machine usually is present. Supported by a rather substantial bracket or adjustable arm extending upward and outward from the upper portion of the vertical dental stand is a dental light. By the time a patient sits in the dental chair and is surrounded by all of this paraphernalia, it is no wonder that many patients have considerable reluctance to visit a dentist's office.

In relatively recent years, cabinetry of conventional hip height has commenced appearing in dental offices, the same extending along one or more walls of the office and being somewhat continuous and uniform in both appearance and height. Counter surfaces have been provided on such cabinetry upon which either a dentist or his assistant may place either certain additional dental apparatus, or various instruments and items with which a dentist is required to operate, depending upon the service and treatment required by various patients' conditions. Storage drawers and cabinets closed by harmonious doors are employed in such cabinetry to normally obscure various accessories built into the same, whereby some of the previous cluttering and formidable appearing apparatus has commenced to disappear from the dentist's office of the present day.

Particularly since the advent of the so-called dental stand comprising a vertical post-like arrangement for supporting the well-known glass or porcelain dental tray and cuspidor, such dental stand has been fixed in its position in the dental office. The axis about which the conventional dental chair is mounted to revolve also has been fixed in such office. Such arrangement affords very little latitude within which a dentist or his assistant can operate. Such restriction is even more evident when considering whether the dentist or his assistant are right or left-handed. The chair has always been placed close to the dental stand, for obvious reasons. The only latitude of movement, however, which is afforded by such arrangement is in regard to swivelling the chair about a fixed vertical axis, through approximately a maximum angle of 45°, and also raising and lowering the seat portion and back of the chair, whereby the patient can be made to sit at certain upright positions or relatively reclined positions, as required for specific dental operations.

Within very recent years, a few attempts have been made to mount at least certain dental instruments within a housing movably supported on casters or pivotally supported relative to the axis of a dental stand for movement within a substantially horizontal plane and thereby somewhat dispose the dental instruments carried thereby at adjustable positions, laterally, with respect to the dental stand. However, moving the stand has created new problems while only partially solving old ones. Briefly, the stand is always a traffic obstruction around the chair, blocks access to instruments in wall cabinetry, and its service lines are a hazard while lying across the floor. Some of these changes have been made necessary by the advent, within recent years, of stools movably mounted adjacent the dental chair for use respectively by the dentist, his assistant, or both, while the dentist is operating upon a patient. Various studies have shown that the use of such stools tend to save time in the performance of certain dental operations, and also relieve the dentist and his assistant of the strain occasioned by standing on their feet most of the day.

Notwithstanding all of these various innovations, however, the present arrangement of the dental office or operatory has still retained the fixed position of the dental stand, more or less in the middle of the floor of the room, and the axis of rotation of the dental chair, restricted approximately to an angle of 45°, has been fixed similarly to the floor adjacent the dental stand. Everything has to be brought to the patient or moved about the patient, whereby the present concept is patient-oriented.

Not until the advent of a companion invention pertaining to a readily movable dental chair, developed by the same inventors of the instant invention, has there been any departure from this patient-oriented concept of a dental office or operatory. However, by rendering the patient readily movable to different locations or areas within a dental operatory, the overall arrangement of the entire counter layout and equipment disposition within the operatory now can be changed so that it no longer is patient-oriented. Rather, all of the equipment may be mounted in convenient and logical locations within the operatory ad the patient is moved to the equipment, as desired or required, rather than vice versa, as heretofore necessary.

In addition to other various time-honored concepts which have long been adhered to by the dental profession, as described above, a further one comprises the lack of recognition of extreme differences in maximum and minimum heights of different dentists and dental assistants, which differences are compounded when one is seated and the other is standing, especially regarding the "comfort zone" of reach each must have to obtain an instrument from the dental stand. For example, dental stands, cabinets, counters, and other corresponding accessories, long have been made at fixed elevations above the floor surface. Notwithstanding this, it is well-known that very substantial differences in height exist in dentists and dental assistants. Presumably, the height of such standard type of equipment is selected to best suit the average height of dentists, which obviously places the relatively short and relatively tall dentists and dental assistants at extreme disadvantage in using such equipment, as well as discomfort in doing so.

Depending upon whether he operates always, sometimes or never with an assistant, the instruments may be reached for by a dentist directly, or by his assistant. The problems caused by these differences in size are compounded by the fact that some dentists sit while their assistants stand, and vice versa. Since even a full time assistant must occasionally leave the room, the desirable operating height is frequently changing.

About the only effort thus far made to compensate for differences in the height of dentists and dental assistants has been in regard to dental chairs, which are constructed for raising and lowering of the seat and back of the chair relative to the base. Similarly, dental stools are made vertically adjustable for both dentists and dental assistants. This, however, is as far as the dental equipment industry has progressed with respect to accommodating dentists and assistants of varying heights. Further, the presently increasing tendency for dentists and dental assistants to operate while seated upon stools, thereby greatly shortening the vertical distance of their arms above the floor surface, further accentuates the problems of readily handling instruments and accessories which, at present, are disposed at a fixed vertical height above the floor in present dental operatories, substantially without exception. This difficulty can be appreciated all the more from the fact that it is recognized that the most comfortable reaching position is 15° above the horizontal from the elbow.

It is the principal purpose of the present invention to provide a dental equipment stand arranged to accommodate, within a single cabinet-type structure, a very substantial number of dental instruments and accessories, many of which have heretofore been mounted either in separate cabinets or upon separate stands, or attached to various arms and supports projecting from the customary fixed type of dental stand, all of the same being supported by a common head, which, in the preferred construction of the invention, comprises a carriage which is readily adjustable vertically with the head relative to the cabinet to best suit the dentist or dental assistant using the same, regardless of whether standing or seated, and irrespective of the natural height of the dentist or dental assistant, whereby the dental instruments and accessories carried by said head will be disposed at a position offering maximum convenience to the dentist or dental assistant.

Another object of the invention is to not only render the carriage which supports the various dental instruments vertically adjustable, but also provide apparatus which supports the carriage in the upper portion of a cabinet, either similar to or harmonious with conventional counter-type cabinetry now becoming popular in modern dental operatories, said carriage normally being enclosed within said cabinet when inoperative, both for esthetic and sanitary reasons, but, upon being rendered operative, said carriage is projectable forwardly with respect to the supporting head and cabinet so as to dispose all of the dental instruments and accessories in readily accessible position for engagement by the dentist or his assistant.

Still another object of the invention ancillary to the foregoing object is the provision of foolproof and effective mechanism in the dental cabinet operable to not only elevate the head and carriage which supports the dental instruments, but also, preferably simultaneously, project the carriage forwardly beyond the front face of the cabinet to dispose the head and instruments carried thereby at an initial operative position of minimum height and, thereafter, the head and projected carriage are movable vertically relative to the base of the cabinet to any desired height, at least within reasonable limits, to suit the convenience of the dentist or his assistant; retraction of the carriage and head to the concealed, storage position thereof within the upper portion of the cabinet being effected, preferably automatically, by mechanism operating in reverse to that by which the head is elevated and projected.

A further object of the invention is to provide the dental equipment stand with a top that preferably is horizontal and constitutes a movable portion of the counter surface of the other cabinetry in a modern dental office, said top being movable vertically with the instrument-carrying head of the stand, but not moving forwardly with the carriage within said head when at least the front-portion of said carriage is projected outwardly beyond the front face of the cabinet of the stand, whereby said top serves as an operable surface upon which further instrumentation or various dental accesories may be disposed while the stand is in operation.

As an adjunct to the foregoing object, the top of the stand preferably is removable so as readily to expose the interior of the head which contains the carriage and the various dental instruments, so as to render said instruments capable of being serviced quickly and effectively.

A still further object of the invention is to provide a sub-housing within the walls of the dental stand, said sub-housing being associated with the vertically movable head and carriage of the stand and depending therefrom for vertical slidable movement closely adjacent the inner surfaces of the sides and front walls of the dental stand, thereby to shield and obscure the equipment and mechanisms contained therein, and interconnected to the various dental instruments supported by the carriage of said stand.

Still another object of the invention is to provide the upper portion of said sub-housing with a frame having guide or track means for slidably supporting the carriage which supports all of said dental instruments, whereby said carriage readily may be moved forwardly relative to the upper portion of said sub-housing, said frame also preferably supporting the top of the dental stand removably.

A further object of the invention ancillary to the immediately foregoing object is to provide the supporting frame and instrument-supporting carriage with cooperating means by which the carriage not only may be moved forwardly beyond the front face of the dental stand, but, in addition, said carriage readily may be tilted upwardly at one end, for example, completely removed vertically, or turned over upon itself and still be supported by said frame for servicing, replacement, or the like, thereby greatly facilitating such servicing or replacement.

Still another object of the invention is to provide various suction units and utility supply means connected to manifolds within the cabinet portion of the dental stand, there being flexible connections between the various dental instruments and accessories supported by the carriage of the stand and said utility-supplying and suction means which are compactly arranged within the cabinet.

A further object of the invention closely related to the foregoing object is to provide modular or cartridge-type units which preferably are mostly of uniform size and configuration and which are separably connected to the carriage of the dental stand for ready replacement or interchangeability, said modular units each having an independent reel for a coilable, flexible supply conduit connected to one of the dental instruments and arranged compactly to contain the supply conduit for ready extension thereof by the dental instrument when it is desired to use the same.

Details of the foregoing objects and of the invention, as well as other objects thereof, are set forth in the following specification and illustrated in the accompanying drawings comprising a part thereof.

In the drawings:

FIG. 1 is a perspective view of an exemplary configuration of dental equipment stand illustrating, in full lines, the head and carriage of the stand elevated and projected forwardly to its initial position, and, in phantom, showing a selected additional elevated position thereof.

FIG. 2 is a side elevation of the stand shown in FIG. 1 illustrating the head and carriage in fully depressed and retracted position within the upper portion of the cabinet of the stand, this view illustrating, in dotted lines, certain of the details of the actuating mechanism for the head of the stand.

FIG. 3 is a fragmentary, vertical elevation of a portion of the head actuating mechanism, as seen on the section line 3—3 of FIG. 2.

FIG. 7 is a fragmentary, foreshortened side elevation of another portion of the actuating mechanism for the head of the dental stand and illustrated on a scale substantially commensurate with that of FIGS. 5 and 6.

Figure 8:
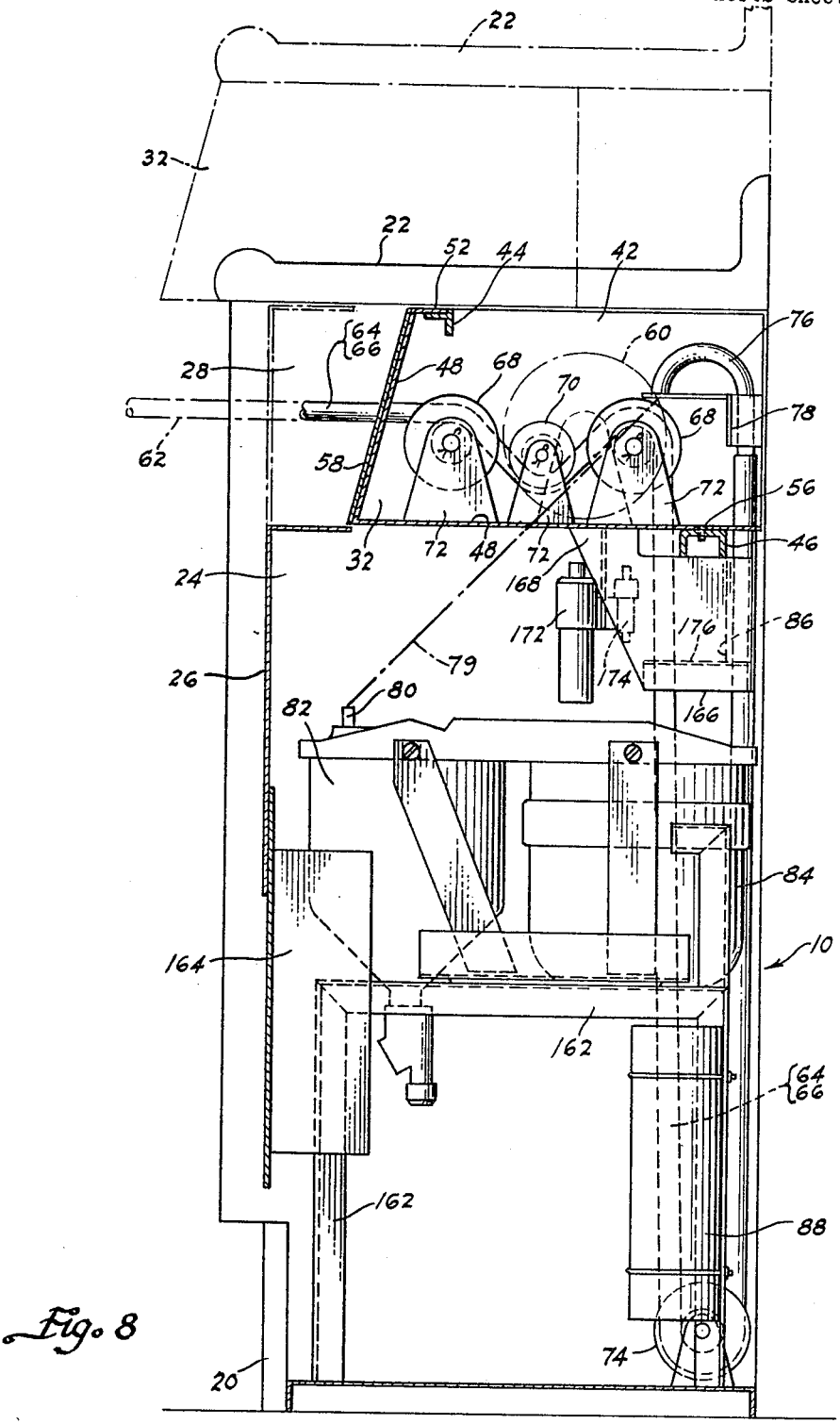

FIG. 8 is a vertical, sectional view of the dental stand illustrated in FIGS. 1 and 2, taken adjacent the right-hand side of said stand, as viewed in FIG. 1, and illustrating, on a scale similar to that of FIGS. 2 and 3, certain details of the suction and manifold means embodied in the cabinet of the stand, the head and carriage of the stand being shown in storage position, in full lines, and, in phantom, said head and carriage being shown elevated and projected to the initial vertical position thereof.

FIG. 9 is a top plan view of the head of the stand shown positioned within the cabinet in the same location as in full lines in FIG. 8, the top of the cabinet having been removed to render the interior of the head visible.

FIGS. 10, 11 and 12 respectively are condensed front, fragmentary top plan and fragmentary side elevations principally of the front face of the cabinet of the dental stand and showing particularly the panel and door arrangement of said front face.

FIG. 13 is a fragmentary side elevation of frame means for supporting the movable carriage of the head and the top of the cabinet supported thereby.

FIG. 14 is a fragmentary, foreshortened partially vertical sectional view of a portion of the upper end of the cabinet of the dental stand, as seen on the line 14—14 of FIG. 13.

FIG. 15 is a vertical sectional view of an exemplary latch means for connecting the top of the dental stand to the frame which supports it.

FIGS. 16, 17 and 18 respectively are diagrammatic side elevation stick drawings showing simplified progressive positions of the actuating mechanism for the head and carriage of the dental stand from its storage position within the upper portion of the cabinet, to its partially elevated and partially forwardly projected position of the head and carriage, and finally to the fullest forwardly projected position of the carriage and initially elevated position thereof and said head at the upper end of the cabinet.

FIG. 19 is a perspective, diagrammatic illustration of manifold means and control valves for delivering water and air requirements to the various dental instruments carried by the head.

Relative to describing the characteristics and functions of the dental equipment stand comprising the present invention, it is to be understood that the structure which is specifically illustrated in the drawings has been designed to be stationary, or at least relatively so. However, it is within the purview of the present invention to render the dental equipment stand portable by any suitable means, whereby the present description and scope of the appended claims is not to be restricted to a dental stand that is solely of a stationary nature.

Referring particularly to FIGS. 1, 2 and 8, it will be seen that the dental equipment stand comprising the present invention, which has been illustrated in its preferred embodiment in the attached drawings, comprises a cabinet 10 having opposite sides 12 and a composite front face which is preferably composed of a relatively stationary, intermediate panel 14, a door 16 hinged to one side 12, and a readily removable upper panel 18. The face of the cabinet preferably terminates at the bottom with a rearwardly extending recess defined by a kick plate 20. Extending across the upper edges of the sides 12 of the cabinet, when the cabinet is in inoperative position, is a top 22, which preferably is horizontal and is similar to, or at least harmonious with, modern types of counter tops currently employed in relatively modern dental operatories. In other respects, particularly in regard to the front face and sides of the cabinet 10, the decor and dimensions of the cabinet are also harmonious with modern cabinetry which currently is finding increasing favor for use in dental operatories.

Head and carriage of cabinet

Figure 4:
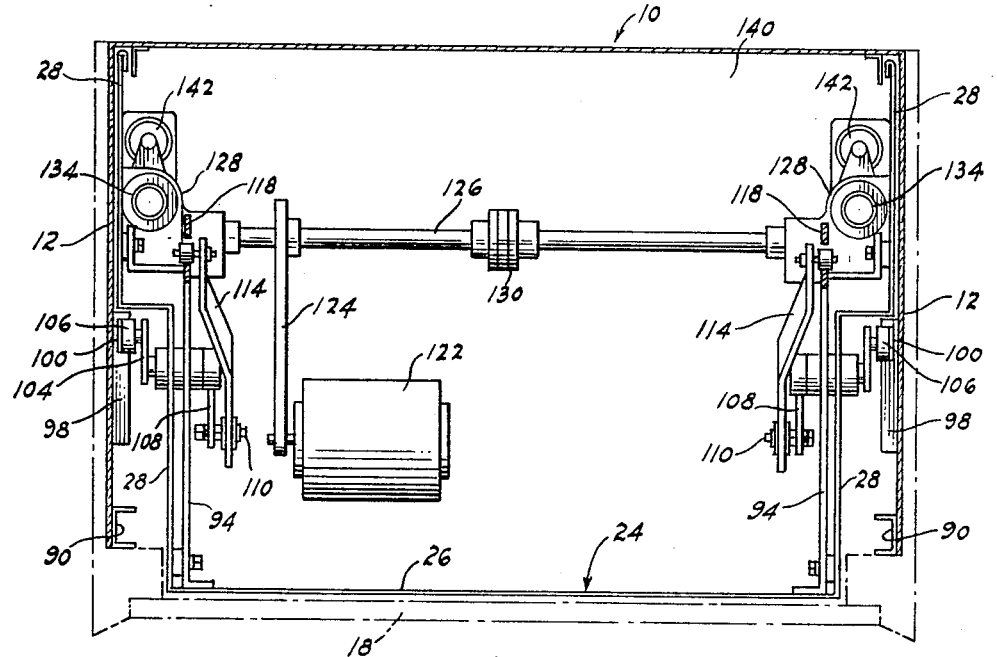
FIG. 4 is a sectional plan view of the dental stand, as seen on the line 4—4 of FIG 2.

Movable vertically within the cabinet 12 is a sub-housing 24, the general outline of which in plan view is best shown in FIG. 4. Said sub-housing 24 comprises a front wall 26 and side walls 28. Said front and side walls of said sub-housing depend from the upper portion thereof, which constitutes a head 30 that, in FIG. 1, is shown in its initially elevated position in full lines, while a still higher elevated position thereof is shown in phantom. The head 30 supports a carriage 32 for substantially horizontal movement relative to the vertical axis of cabinet 10, in forwardly projecting and rearwardly retracting movements. Suitable mechanism to effect such movements is described hereinafter.

Supported by the upper end of sub-housing 24 is a top frame 34, certain details of which are best shown in FIGS. 2, 13 and 14. Said frame comprises a pair of opposed angle irons or rail members 36, which are parallel to each other and substantially horizontal and comprise track means for supporting the dental instrument-supporting carriage 32 movably in opposite directions parallel to said track means. To facilitate movement of the carriage 32 relative to frame 34, pairs of antifriction rollers 38 are fixed to the upper portions of opposite sides of the carriage 32 for rolling engagement with the lower, horizontal flanges of the rail members 36, as clearly shown in FIG. 14.

As best can be seen from FIGS. 13 and 15, the top 22 is also supported by the frame 34, preferably detachably. For this purpose, the lower surface of the top 22 appropriately is recessed to accommodate the members comprising frame 34, and particularly the forward cross member 38 and the rearward cross member 40. The forward cross member 38, as best shown in FIG. 15, also carries disengageable connecting means operable relative to top 22, such as a spring-pressed latch 43, the forward end of which engages an appropriate recess formed in the recessed portion of top 22, as clearly shown in FIG. 13. The rearward end latch 43 extends downwardly to be readily engaged by an operator for purposes of removing the top 22 when desired, especially to expose the interior of carriage 32, and particularly the means therein for supplying fluid or current to the various dental instruments carried by carriage 32, details of which are described hereinafter.

Modules of carriage

As best seen from FIG. 3, somewhat fragmentarily, carriage 32 comprises opposed, parallel side members 42 to the upper ends of which the rollers 37 are pivotally connected. Extending between the side members 42 are transverse supporting members 44 and 46, the same primarily being for purposes of supporting bracket-like frames 48 comprising essential portions of instrument modules 50, which, in directions transverse to the front wall of carriage 32, as best seen in FIG. 1, are substantially equal in width, or multiples of such width dimensions. Modules 50 are readily detachable from the carriage 32 by reason of the frames 48 having upwardly and rearwardly extending front portions terminating in short, horizontal ears 52, which overlie supporting member 44 of carriage 32 and are secured thereto by screws 54, see FIG. 9. The frames 48 otherwise each comprise substantially horizontal and rearwardly extending portions clearly shown in FIG. 8, the rearward ends of which overlie the supporting member 46 of carriage 32 and are secured thereto by screws 56.

Especially from FIG. 9, it will be seen that the modules 50 readily are accessible after top 22 has been removed, and it also will be apparent that the width of said modules are such that they readily may be interchanged with each other in various ways, particularly to suit the convenience of a particular dentist or dental assistant in regard to certain particular dental instruments, it being understood that different instruments respectively are carried by said modules.

For convenience of viewing for selection and access to the instruments for withdrawal from the carriage, it will be seen that the front face of the carriage 32 slopes forwardly and downwardly. Hence, particularly when the carriage is projected to an initial elevated position, shown in full lines FIG. 1, wherein the head 30 and carriage 32 are raised only to the upper edges of the cabinet 10, and the carriage 32 has been projected forwardly, as shown in said figure, the various exemplary dental instruments carried by the modules 50 readily are accessible, especially in view of such sloping arrangement of the front face of the various modules 50.

For esthetic purposes particularly, as well as convenience of labelling, interchangeability, and other purposes, the front face portion of each of the modules 50 has a finished panel 58 which preferably is detachably connected thereto, the same being of esthetic color and finish and provided with appropriate openings through which the dental instrument carried by any particular module extends. Such panels 58 also have appropriate openings therein through which gauge dials and the like, are viewable, in the event the instrument carried by any particular module has a gauge dial associated therewith, somewhat as shown in exemplary manner in FIG. 1.

The frames 48 of the various modules also each preferably support rotatable reels 60 which, as best seen from FIGS. 8 and 9, are supported by appropriate brackets of suitable type and have either flexible supply conduits 62 of tubular type for supplying fluids, or electric conduits for supplying electric current, rotatably coiled thereupon by appropriate conventional coil springs, or the like, not shown. The inner ends of such supply conduits may be connected to appropriate manifold constructions associated with the pivots for the reels, while the outer ends thereof are connected, detachably or permanently, as desired, to the handle portions of the various dental instruments to be supported by the front face of the modules 50.

From FIG. 9, it will also be apparent that the modules 50 shown nearest the left-hand side of cabinet 10 is approximately twice the width of the other modules 50, and said module includes a different arrangement of conduits and supporting means therefor than is illustrated relative to the other modules. Such different arrangement comprises a pair of hollow, flexible conductors or conduits 64 and 66, which, as best shown in FIGS. 9 and 10, extend around an arrangement of guide and tensioning pulleys 68 and 70, which are supported by appropriate brackets 72 fixed, for example, to the bottom portion of the frame 48 for the module nearest the left side of FIG. 9.

The conduits 64 and 66 extend downwardly within cabinet 10 and pass around a pulley-type weight 74 mounted for vertical movement and operable to take up slack in the flexible conduits 64 and 66 as they are retracted and replaced with respect to the carriage 32. After passing around the retractable pulleys 74, the conduits 64 and 66 extend upwardly along the rear wall of the cabinet 10 and are connected at the upper ends thereof to fixed, curved tubes 76 carried by an appropriate bracket 78, see FIG. 8. Said tubes 76 are connected by a suitable conduit, preferably flexible and diagrammatically indicated by line 79, to the suction inlet nipple 80 of an evacuating chamber 82 supported compactly within the cabinet 10, the vacuum being provided by an appropriate vacuum pump and electric motor unit 84. The outer end of conduits 64 and 66 respectively are connectable, preferably quickly and detachably, to a cuspidor and saliva ejector.

The various handpieces and other types of dental instruments which are intended to be accommodated by the various modules 50 are supplied through the coiled, flexible conduits and conductors 62 from appropriate air and water manifolds 86, which are illustrated in exemplary manner as a group in FIG. 9, for example. These manifolds are arranged to be connected, by suitable means, to appropriate sources of air under different, required pressures, all of which can be supplied through appropriate control and regulating valves, not shown.

The manifolds 86 are connected appropriately through flexible conduits, or otherwise, to suitable rotary joints associated with each of the reels 60, in accordance with conventional design and construction, but which are not illustrated in detail herein. Also, for convenience, there is provided, in the lower portion of the cabinet 10, as shown in FIG. 8, an appropriate water heater 88 in order that water furnished to at least certain of the manifolds 86 may be heated for delivery to a warm water syringe or spray, for example, which is intended to be carried by one of the modules 50, in accordance with the concept of the present invention.

Carriage actuating mechanism

The sub-housing 24 and the carriage 32 carried thereby are moved in opposite vertical directions, and the carriage is moved transversely, preferably horizontally, between forward projected positions and rearward retracted positions relative to the head 30 at the upper end of the sub-housing 24 by power-driven mechanism which now will be described. Reference especially is made to FIGS. 2, 3, 5, 6, 7 and 16–18 with respect to describing the details of said mechanism, as follows.

Figure 5:
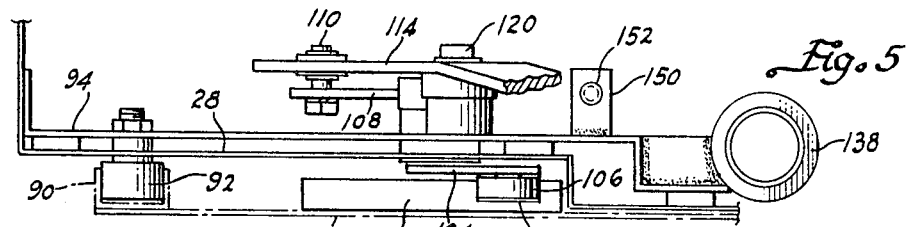
FIG. 5 is a fragmentary, partially horizontal sectional plan view of the operating mechanism illustrated at the right-hand side of FIG. 4, but shown on a larger scale than in said figure.
Figure 6:
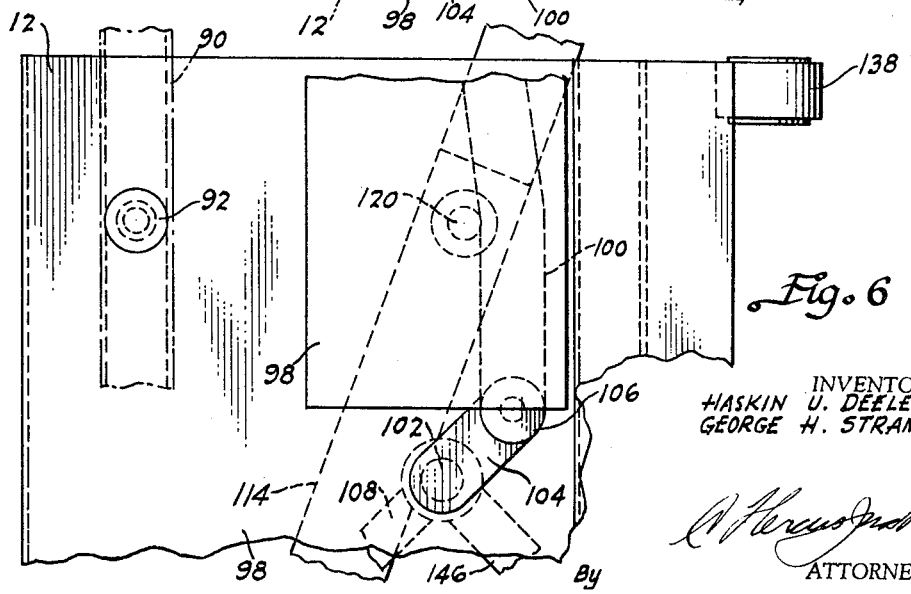
FIG. 6 is a fragmentary side elevation of the portion of the actuating mechanism shown in FIG. 5.

Fixed to the inner surface of each of the sides 12 of the cabinet 10, preferably adjacent the forward edges thereof, is a pair of guide channels 90 which each receive vertically spaced pairs of guide rollers 92 rotatably carried by the side walls 28 of the sub-housing 24, there being a pair of such rollers 92 on each of said side walls 28, as best shown in FIGS. 2, 5 and 6. This arrangement readily assures guided, relative vertical movement between the sub-housing 24 and the cabinet 10 without cocking. Fixed to the lower portions of each of the side walls 28 is a relatively heavy gauge plate 94, a plurality of screws 96 being used to effect such connection, as shown in FIG. 2. Fixedly carried by the inner surface of each of the sides 12 of the cabinet is a guide block 98, which has an irregularly shaped cam groove in the blocks on opposite sides of the housing being mirror images of each other.

The heavy plates 94 at opposite sides of the sub-housing 24 are provided with bearings through which short shafts 102 extend for pivotal support thereby. Fixed to the outermost ends of said shafts relative to sides 12 of the cabinet are short levers 104 having a roller 106 pivotally connected to the outer end thereof, said rollers 106 at opposite sides of the cabinet respectively being receivable within the irregularly shaped cam grooves 100 in the blocks 98, especially during the initial vertical movement of sub-housing 24.

Connected to the opposite ends of the shafts 102 are additional short levers 108, having pintles 110 thereon which extend through suitable bearing rollers disposed within open ended slots 112 in the lower ends of actuating levers 114, the upper ends of which levers 114 also have transverse pintles 116 extending therethrough which are provided with antifriction rollers thereon for reception within a fork member 118 having a slot opening downwardly. There is one of said fork members respectively adjacent each of the opposite sides of the carriage 32 and fixed thereto, as clearly shown in FIGS. 2 and 3 particularly.

Mounted within the lower portion of the cabinet 10 is suitable power means, such as an electric motor 122, which is interconnected through endless flexible means 124 to a drive shaft 126. The opposite ends of said drive shaft are interconnected to gear reduction means 128 mounted respectively adjacent opposite sides of the cabinet 10. If desired, a flexible coupling 130 may be disposed within shaft 126 intermediately of the ends thereof.

Extending upward from each of the gear reduction units 128, and rotated thereby, is an elongated threaded shaft 132 which is coaxial with a pair of sleeves 134 respectively placed, compactly, adjacent opposite sides of the cabinet 10, as can be best seen from FIG. 4. Fixed preferably to the lower end of each of the sleeves 134 is a ball nut 136 through which the threaded shaft 132 extends and the ball nut 136 is elevated by the balls therein, which coact with the threads of shaft 132, whereby the sleeves 134 at opposite sides of the cabinet 10 are elevated evenly and simultaneously. Suitable guide bearings 138 are fixed to the side walls 28 of the sub-housing 24 intermediately of the ends of the sleeves 134 so as to brace the latter. Preferably, the gear reduction units 128, as best seen from FIG. 7, are supported relative to the bottom plate 140 of cabinet 10 by shock-absorbing mounts 142 of conventional construction.

Fixed to and extending laterally from each of the vertically movable sleeves 134 is a flat arm 144, which is connected thereto between the guide bearing 138 and the ball nut 136, as best shown in FIGS. 2 and 7. Each of the short levers 108 actually is one leg of bell cranks respectively supported by shafts 102 which are fixedly carried by the heavy plates 94 adjacent opposite sides of sub-housing 24. Said bell cranks comprise additional legs 146 which are substantially within the same plane as levers 108 and extend substantially at 90° thereto. The outer ends of the legs 146 are pivotally connected to the lower ends of links 148, the upper ends of the latter being pivotally connected to the outer ends of the flat arms 144. Such arrangement is best illustrated in FIGS. 2, 5 and 6, and also in FIG. 3, but, in the latter figure, leg 146 necessarily is in front of lever 108. Also carried by the inner surface of each of the heavy plates 94 at opposite sides of sub-housing 24 is a boss 150, which threadably receives a vertically adjustable stop screw 152 shown in FIGS. 2, 5 and 7.

Operation of carriage

In its inoperative position, the cabinet 10 and all the contents thereof are in the relative positions shown in FIG. 2, in which the carriage 32 is in its retracted position within head 30 in the upper portion of cabinet 10 and the top 22 is substantially in alignment with the counter portions of adjacent cabinetry, for example, in the operatory. When the dentist or his assistant desires to render the dental instruments carried by the carriage 22 readily accessible, and particularly at a vertical elevation best suited to the height of either the dentist or his assistant, and depending upon whether they are standing or seated upon a dental stool, it is only necessary to depress the proper switch button of the main control switch 154. Said switch is connected to the circuit of motor 122 and, for convenience, as well as esthetic appearance, either is permanently mounted upon the kick plate 20 where it is somewhat inconspicuous, or the same may be connected through a flexible conduit, not shown, in said motor circuit so that the switch may be temporarily stored within the lower portion of the cabinet 10. Access to such portable type of switch may be had by opening the door 16. It will be understood also that other types of control means than switch 154 may be used, even an electric-eye circuit, if desired.

Assuming it is desired to elevate the upper portion of the sub-housing 24, and especially the carriage 32 carried thereby, the "UP" button of switch 154 is contacted by the foot of the operator, for example, so as automatically to initiate movement of the motor 122 in the proper direction to effect such elevation of the carriage 32. It will be understood that the motor 122 is of the reversible type. Activation of motor 122 causes both of the threaded shafts 132 to revolve simultaneously, whereby even elevation of sub-housing 24, without cocking, takes place.

Elevation of said sub-housing 24 is caused by the arms 144 that are fixedly connected to sleeves 134 and which, when elevated, thereby elevate the links 148 connected to the ends of bell crank legs 146. The pivot shafts 102 for the bell cranks are fixed relative to the side plates 94 of sub-housing 24 and, inasmuch as the short levers 104 are likewise fixed to the shafts 102 for movement in unison with the bell cranks respectively adjacent opposite sides of the sub-housing, it will be seen that no pivotal movement of the bell cranks or of the levers 104 can occur by reason of the rollers 106, which are pivotally connected to the outer ends of the levers 104, being disposed in the lower ends of the vertical portions of cam grooves 100 in guide blocks 98.

From FIG. 2, as well as FIGS. 16–18, and especially FIG. 16, it will be seen that when rotation of the threaded shafts 132 is initiated, sleeves 134 are elevated simultaneously and, likewise, cause simultaneous elevation of arms 144. For a ready appreciation of movements to be explained hereinafter, it should be borne in mind that the sleeves 134 are capable of moving vertically relative to and independently of the sub-housing 24. This is possible in view of guide bearings 138 being carried fixedly by said sub-housing to permit such relative vertical movement between the sub-housing and the sleeves 134. However, due to the bell cranks and linkage arrangement being controlled through the irregularly shaped cam slots 100, there is a certain amount of equal vertical movement, simultaneously, of sleeves 134 with sub-housing 24.

During such initial vertical movement of the sleeves 134, and due to the fact that the rollers 105 are both movable in their respective vertical lower portions of the cam grooves 100, equal and simultaneous vertical travel of the sub-housing 24 and the sleeves 134 occurs. This is due to the fact that, while there is a tendency for such elevating movement of the arms 144 to attempt to revolve the legs 146 of the bell cranks about their pivots 102, such pivotal movement is impossible because of the vertical and parallel lower portion of cam grooves 100 with respect to the path of travel of the sub-housing 24 and sleeves 134. As a result of this, the actuating levers 114 likewise solely move vertically without having any initial pivotal movement about the axis of their supporting shafts 120.

It will be seen that, about midway of the length of the cam grooves 100, as viewed in FIG. 2 particularly, and considering the fact that there is a corresponding groove on the opposite side of the frame of the cabinet, which is a mirror image of the one shown in FIG. 2, said grooves commence to extend forwardly, as well as upwardly. Referring to FIG. 17 particularly, it will be seen that the roller 106 on lever 104 is disposed in this slightly angled upper portion of the groove 100, whereby, in addition to the vertically movable sleeves 134 elevating the sub-housing 24 and carriage 32 in the upper portion thereof, movement of the carriage 32 forwardly is starting to be instituted. Ultimately, when the rollers 106 reach the upper curved portion 156, as seen in FIG. 2, the rotating tendency exerted by links 148 upon the bell cranks results in said bell cranks being rotated counter-clockwise, as viewed in FIG. 2, whereby the levers 108 of the bell cranks will rotate the actuating levers 114 counter-clockwise. As viewed in FIG. 18, it will be seen that, by the time the rollers 106 have reached the dwell portion 158 of groove 100, the levers 114 have been moved quite substantially, counter-clockwise, so as to project the front face of the carriage 32 beyond the front wall of the cabinet 10.

By reason of the movement of the bell crank units about their supporting shafts 102, relative vertical movement between the threaded sleeves 134 and sub-housing 24 is made possible and, ultimately, particularly when the relative positions of the rollers 106 and cam grooves 100 is as shown in FIG. 18, wherein said rollers are disposed within the dwell portions 158 of said cam grooves, the sleeves 134 will have been moved vertically relative to the sub-housing 24 sufficiently that the actuating arms 144 on sleeves 134 will have been moved into engagement with the adjustable stop screws 152 carried by bosses 150, which are fixed to sub-housing 24. When this occurs, the position of the bell cranks relative to the sub-housing 24 will remain unchanged from the position shown in FIG. 18, and this position is referred to hereinafter and the appended claims as the initial elevated position.

In this position, the bell crank units do not rotate because the carriage 32 will have been projected substantially to the extent shown in FIG. 18, and, in accordance with the preferred embodiment of the invention and the operation of the electrical control system included therein, closing of the control switch 154 to initiate operation of motor 122 will cause continuous movement of all of the actuating mechanism described hereinabove until the carriage 32 reaches this initial elevated position shown in FIG. 18. Then, however, in the preferred operation of the dental stand comprising the invention, the actuation of carriage 32 stops in the absence of any further elevation thereof by mechanism now to be described.

If the initial elevated position, as well as the forward projection in the carriage 32, as illustrated in FIG. 18, is not sufficiently high to be comfortably suited to a dentist or dental assistant, whether seated or standing, it is only necessary to actuate either switch 154 again or, if desired, an additional switch 160, which is suitably connected in the circuit of the motor 122. Particularly if it is desired to move the sub-housing 24 and carriage 32 to a position still higher than that shown in FIG. 18, such as the exemplary position illustrated in phantom in FIG. 1, for example, it is only necessary to actuate said switches as referred to above, but, in accordance with the preferred system of operation of the dental stand, the dentist or assistant should hold the switch ON until the carriage 32 has been elevated to the desired position. Upon reaching said position, the switch is then released and vertical movement ceases, quickly. Due particularly to the threaded arrangement of the elevating means comprising rotatable shafts 132 and non-rotatable sleeves 134, when the elevation of the carriage 32 is stopped by releasing the switch controlling the operation of motor 122, such position is firmly maintained, as if it were locked, without requiring any braking or locking mechanism.

From the desired elevated position of the carriage 32, it will readily be seen, especially from FIG. 1, that the various dental instruments carried by the front, sloping face of the carriage readily are viewable and accessible for withdrawal from the carriage by the dentist or his assistant. Should, for example, the dentist be standing when initially using the instruments and he later decides to be seated upon a dental stool, it is only necessary for him to actuate the switch 160, for example, to cause the carriage to move in the "DOWN" direction so as to cause the carriage 32 to be depressed to a desired, comfortable position.

At the conclusion of operation of the dental instruments, such as at the close of the day or otherwise, and it being desired to restore the carriage 32 to its inoperative position, such as illustrated in FIGS. 2 and 16, for example, it is only necessary to operate switch 160 in the "DOWN" direction until the carriage 32 has been moved to the full line position thereof shown in FIG. 1, following which switch 154, for example, is actuated by pressing the "DOWN" button, whereupon the motor 122 continues to be moved in proper direction to move the various bell cranks, links and levers in reverse direction to that described above incident to elevating and projecting the carriage 32. Such descending and retracting movement of carriage 32 is effected automatically and quietly until the carriage 32 is completely restored to its inoperative position shown in said FIGS. 2 and 16. Movement of the carriage 32 in transverse directions relative to the vertical axis of cabinet 10 is insured preferably by reason of the fact that the upper end of actuating levers 114 preferably are provided with antifriction rollers on pintles 116, which are disposed within the vertical slots or notches of fork members 118 depending at opposite sides from the bottom of the carriage 32.

*Servicing the carriage*

During the vertical and projecting movements of the carriage 32 by the mechanism and functions described above, the top 22 preferably remains horizontal, but is moved vertically with the carriage and upper portion of the sub-housing 24, to which it is detachably connected through the medium of being supported by top frame 34 of said sub-housing. When it is desired to interchange, exchange, or service the various modules of the carriage 32, and assuming that the particular part of the modules desired to be serviced would be readily accessible through the simple removal of top 22, it is only necessary to actuate latch 43, or any other suitable connecting means, such as by first detaching removable panel 18, when necessary, so as to readily gain access to said latch while the carriage 32 is in its lowermost and retracted position, such as illustrated in FIG. 2.

In the event the mere removal of top 22 from the position shown in FIG. 2, for example, does not provide adequate access to the various modules desired to be serviced, exchanged or interchanged, however, and assuming that top 22 has been removed through the procedure described above, the carriage 32 then is elevated and projected to the full line position thereof shown in FIG. 1, for example, by motor 122 and the mechanism driven thereby. The carriage 32 then readily is tiltable by elevating one end or the other with respect to the top frame 34 while, for example, the opposite end of the carriage is still supported by its rollers 37, which normally engage the rail member 36 of top frame 34. Actually, if desired or necessary, the carriage 32 may be completely inverted by rotating the same substantially 180° about one or the other pair of opposite rollers 37, until the other pair of rollers again engage the rail member 36. Said rollers and rail members will adequately support the carriage in such inverted position for very substantial access to the interior of the various modules contained in the carriage 32.

For access to the various devices carried in the mid portion of the cabinet 10, such as the evacuating chamber 82, and pump and motor unit 84, it will be seen, particularly from FIG. 8, that said unit is supported stationarily within cabinet 10 upon an interior frame 162, said frame also being utilized to support the water heater 88. Access to this frame and the mechanism carried thereby readily is obtained by opening door 16, elevating the sub-housing 24 to raise the front panel 26 thereof sufficiently that, for example, the chamber 82 and unit 84 are accessible. If necessary, the intermediate panel 14 can be removed appropriately, such as by removing screws by which it is secured to the front wall of the cabinet 10. Hence, without removing the cabinet 10 from its normally stationary position against a wall of the operatory, for example, it is readily possible to service all of the interior contents of the cabinet, including the electrical connections which primarily are contained within a junction box 164, shown in FIG. 8.

One convenient means for supporting the various air and water manifolds 86, for example, is through the employment of a depending bracket 166, shown in FIG. 8, provided with ends 168 which are connected to the underside of carriage 32, for example. From FIG. 8, it also will be seen that the bank of manifolds 86, otherwise shown in exemplary manner in FIGS. 9 and 19, are supported by bracket 166 adjacent the rear portion thereof. It will be understood that the manifolds 86 are connected by suitable conduits of appropriate material, such as synthetic resin, metal, or otherwise, which extend from outlets in the manifolds 86 to the rotary joints 170 connected to the various reels 60, as indicated somewhat diagrammatically in FIG. 9.

The fluid, whether air or water, to be delivered to the rotary joints 170 will be determined by the particular instruments to be mounted on the ends of the flexible supply conduits coiled upon the reels 60. Inasmuch as the manifolds 86 preferably move with the carriage 32 between projected and retracted positions shown respectively in phantom and full lines in FIG. 8, for example, the conduits between the flexible joints 170 and the manifolds 86 may be substantially rigid.

The bracket 166 also may be utilized to support other auxiliary apparatus to be employed with the various dental instruments carried by the front face of carriage 32. For example, several types of oil atomizing units 172 and 174 may be supported suitably by the bracket 166 and connected through appropriate conduits, not shown, to the rotary joints 170, for example. Said oil atomizing units 172 and 174 also are connected to the appropriate manifold unit 86 to receive air at the desired pressure therefrom, in order to function to atomize oil and introduce it into the air stream for delivery to certain handpieces, for example, contemplated for support by carriage 32.

As illustrated diagrammatically in FIG. 15, an additional air manifold 176 may be interconnected to a relatively high pressure unit of the manifold assembly 86, for example, and then, through the employment of desired reducer or regulator valves 178, 180, air can be delivered at correspondingly reduced pressures to certain other manifold elements of the manifold assembly 86 for delivery to the particular dental instrument which is to use the same by connection of said manifold unit to the appropriate rotary joint 170.

As seen from FIG. 9, an exemplary location of the additional air manifold 176 with which the reducer valves 178, 180 and 182 communicate, is supported by the carriage 32 and, more particularly, by the bracket 166, which depends therefrom. As will be seen from FIG. 15, in which a diagrammatic representation of the distribution of the air and water between the various manifolds and reducer valve is shown, diagrammatic indications also are set forth to illustrate where the air, under maximum pressure from a suitable source, is connected to additional manifold 176, for example, and water, at suitable pressure, for example, is connected also to an inlet water line 184.

If desired, there may be certain manifold or other suitable connections which, for convenience, might be carried by frame 162, for example, and corresponding connections could be supported by bracket 166. Between these connections, flexible, and particularly extensible, conductors of suitable type may extend. The connections carried by frame 162, for example, under such circumstances, could be directly connected with an appropriate air compressor tank and a municipal water supply source of the type usually available in dental offices. Such flexible connections of the type described above, which extend between frame 162 and bracket 166, readily permit the elevation of the carriage 32 relative to the cabinet 10, as well as forward projection of the carriage relative to the cabinet, within all intended and adequate limits therefor incorporated within the structure, in accordance with the principles of the invention.

From the foregoing, it will be seen that the present dental equipment stand comprises a carriage for holding a relatively wide assortment of commonly used dental instruments, as well as accessory devices, such as a saliva ejector and cuspidor which are inter-connectable to an evacuator unit carried within the cabinet or elsewhere. A wide selection of the location thereof in the carriage also is provided, as well as possible accommodation of instruments not yet available. The carriage which supports all of said dental instruments readily is actuated, by power means or by counterweights, springs or by suitable manual means, so as to be raised to an initial elevated position coincident with the top of the cabinet and projected forwardly therefrom. For situations where such initial elevation is not adequate, the forwardly projected carriage may be moved together with the counter-type top from such initial position to still higher elevated positions, all under the control of the dentist or dental assistant to suit the convenience thereof. Retraction of the carriage to its inoperative, stored position within the upper portion of the cabinet is effected directly in reverse to the elevating movement thereof, all without physical effort being required, except to operate electric switches.

Not only is the carriage which supports all of the various dental instruments and accessories readily moved to various elevated and projected positions, but the support of the carriage is such that, through little effort and very simple means, it is possible to inspect, service, exchange and interchange not only the actuating means for the carriage, but also the different supply means for the various dental instruments supported by the carriage, and, particularly, the coilable reels which automatically retract the supply conduits and conductors for said dental instruments which readily are capable of being removed forwardly from the elevated and projected front face of the carriage, to a desired extent, and then readily retracted into the carriage upon completion of the use thereof.

In addition to the foregoing, the cabinet is surmounted by a removable top preferably comprising a section of a counter of the type commonly employed in modern cabinetry for dental operatories, said top being maintained in substantially horizontal position during all positions of adjustment of the carriage relative to the cabinet. Further, when the top is removed, not only is the interior of the carriage rendered readily viewable, but the carriage may be either tilted, completely inverted with respect to a frame in the upper end of a sub-housing, which is vertically movable within the principal cabinet, or completely removed from said sub-housing for purposes of either interchanging certain of the module units or of servicing the same.

While the invention has been described and illustrated in its several preferred embodiments, it should be understood that the invention is not to be limited to the precise details herein illustrated and described since the same may be carried out in other ways falling within the scope of the invention as claimed.

We claim:

1. A dental equipment stand comprising in combination, a cabinet having a front face and base means, said base means being arranged to be supported against vertical movement, frame means in said cabinet, power-driven actuating means connected to said frame means and operable to move the same vertically within and above the top of said cabinet, an instrument supporting carriage supported by the upper portion of said frame means and movable vertically therewith and capable of being elevated selected desired distances above the top of said cabinet, power means to project said carriage forwardly, and guide means carried by said frame and supporting said carriage for substantially horizontal movement forward and rearwardly relative to said front face of said cabinet to permit limited projection of the front portion of said carriage forwardly beyond the front face of said cabinet to an operative position, said frame being movable upwardly selectively desired distances from the top of said cabinet while said carriage is in said projected position.

2. The dental equipment stand according to claim 1 in which the power means to actuate said frame means is mounted within said cabinet below said instrument supporting carriage.

3. The dental equipment stand set forth in claim 1 further characterized by said means to move said carriage vertically and forwardly including cooperating means operable to effect such movements of said carriage simultaneously, whereby said carriage has a compound movement to minimize the time required to move it from storage to operative positions.

4. The dental equipment stand set forth in claim 3 further including power means to actuate said carriage moving means, and control means for said power means operable initially to elevate said carriage a predetermined amount relative to the top of said cabinet.

5. The dental equipment stand set forth in claim 4 further including additional control means operable to elevate said initially elevated and forwardly extended carriage additional selected vertical distances to suit the convenience of the height of the arms of the operators.

6. A dental equipment stand comprising in combination, a cabinet having a front wall and base means arranged to engage supporting means to prevent vertical movement, an instrument-supporting carriage within said cabinet and having a forward face provided with means to support hand-type dental instruments for ready access, means operable to elevate said carriage above the upper edge of said front wall of said cabinet and also advance said forward face of said carriage transversely relative thereto to enhance the accessibility of dental instruments carried by said carriage to the operators.

7. The dental equipment stand set forth in claim 6 further including means operable further to elevate said advanced carriage selectively to different vertical distances above the upper edges of said cabinet to accommodate instruments when carried thereby to the convenience of the operators.

8. The dental equipment stand set forth in claim 7 further including an inner front wall connected to the forward portion of said carriage and depending therefrom and movable relative to the front wall of said cabinet, thereby to shield the interior of said cabinet from view from the front of the cabinet when said carriage is elevated above the upper edges of said cabinet.

9. A dental equipment stand comprising in combination, a cabinet having enclosing side walls and a front wall and base means arranged to engage supporting means, a sub-housing having front and side walls closely adjacent the corresponding front and side walls of said cabinet and movable vertically above the upper edges of said walls of said cabinet to shield the interior of said sub-housing from view when the upper portion of said sub-housing is elevated above the upper edges of said cabinet, an instrument-supporting carriage carried by the upper end of said sub-housing and having a forward face extending above the front wall of said sub-housing and provided with means to support hand-type dental instruments for ready access by an operator, a substantially horizontal top on said sub-housing above said carriage, and power-driven mechanism within said cabinet and interconnected to said sub-housing to move the same vertically and thereby move the carriage conveniently to suit the height of the operator.

10. A dental equipment stand comprising in combination, a cabinet having a front wall and base means arranged to engage supporting means to prevent vertical movement, an instrument-supporting carriage within said cabinet and having a forward face sloping downwardly and forwardly and provided with openings to support therein hand-type dental instruments projecting substantially perpendicularly from the sloping forward face of said carriage for ready access to withdrawal by an operator, and means operable to elevate said carriage above the upper edge of said front wall of said cabinet and advance said forward face of said carriage relative thereto to enhance the accessibility of dental instruments carried by said carriage to the operator.

11. A dental equipment stand comprising in combination, a cabinet having enclosing side walls and a front wall and base means arranged to be supported against vertical movement, a sub-housing within said cabinetry and having front and side walls vertically movable closely to and above the upper edges of the corresponding walls of said cabinet, an instrument-supporting carriage movable vertically with said sub-housing and having a forward face provided with means to support hand-type dental instruments for ready access and extending upward from the front wall of said sub-housing, and power-operated means interconnected to said sub-housing and operable to move the same and said carriage above the upper edge of said walls of said cabinet to expose said forward face of said carriage and position the same at a height selected by the operator for his convenience.

12. The dental equipment stand set forth in claim 11 further including interengaging guide means on said cabinet and sub-housing operable to insure relative ready longitudinal movement therebetween.

13. The dental equipment stand set forth in claim 11 further characterized by said power-operated means comprising mechanism adjacent opposite sides of said cabinet and within the confines of said sub-housing, and motor means connected to said mechanism and operable to elevate opposite sides of said sub-housing simultaneously and evenly.

14. The dental equipment stand set forth in claim 13 further characterized by said mechanism comprising linkage means arranged respectively and closely to the opposite sides of said sub-housing and operable by said motor means to elevate said sub-frame and carriage as aforesaid, and control means for said motor means operable to move said carriage vertically to a position in which the forward face of the carriage is above the front wall of said cabinet.

15. The dental equipment stand set forth in claim 14 further characterized by said linkage means including means operable also to move said carriage forwardly relative to said sub-housing and cabinet, thereby to dispose dental instruments carried by said carriage conveniently for use by an operator.

16. The dental equipment stand set forth in claim 14 further characterized by said linkage means including links and levers and means controlling the movements thereof to cause said linkage means to move said carriage vertically and forwardly to dispose the forward face of said carriage above and forwardly of said front wall of said cabinet.

17. A dental equipment stand comprising in combination, a cabinet having enclosing side walls and a front wall and base means arranged to be supported against vertical movement, a sub-housing having front and side walls closely adjacent the corresponding walls of said cabinet and movable vertically above the upper edges of said walls of said cabinet and operable to mask the interior of said sub-housing in all positions of elevation relative to said cabinet, an instrument-supporting carriage supported by said sub-housing and having a forward face above the front wall of said sub-housing and provided with means to support hand-type dental instruments for ready access by an operator, power-driven means operable vertically within said cabinet, linkage means within said cabinet interconnected to said sub-housing, said linkage being interconnected to and actuated by said power-drive means to elevate said sub-housing and thereby elevate said carriage above the upper edge of said front wall of said cabinet, and control means for said power-driven means operable to cause the same to elevate said sub-housing and cabinet to a height selected at will by the operator appropriate to his convenience.

18. The dental equipment stand set forth in claim 17 further including means connected to said carriage and operable by said linkage during the elevation of said sub-housing and carriage above the upper edge of the front wall of the cabinet to move said carriage forwardly to project the forward face of said carriage beyond the front wall of said cabinet for convenient access of dental instruments carried thereby.

19. The dental equipment stand set forth in claim 18 further characterized by said linkage being operable to elevate said carriage and also move it forwardly simultaneously, whereby said carriage is subjected to compound movement to minimize the time consumed to both elevate and move said carriage forwardly.

20. A dental equipment stand comprising in combination, a cabinet having base means arranged to be supported against vertical movement, an instrument-supporting carriage, means supporting said carriage within the upper portion of said cabinet for vertical and horizontal movement relative to said cabinet, said carriage having a forward portion provided with means to support hand-type dental instruments for ready access, a plurality of reels rotatably supported by said carriage, means operable automatically to rotate said reels in one direction of rotation, flexible elongated supply means for dental instruments connected at one end to said reels and operable to be coiled retractably thereon, power means operable to project said carriage forwardly to a predetermined operative position beyond the front of said cabinet, and power means operable to elevate said carriage to various heights above the upper portion of said cabinet to position said forwardly projected carriage selectively at desired elevated positions relative to the upper portion of said cabinet and thereby provide convenient accessibility of dental instruments when mounted in said carriage in accordance with the height of the arms of the operator relative to said carriage.

21. The dental equipment stand set forth in claim 20 further including manifold means for fluids mounted in said cabinet, and conduit means interconnecting said manifold means and said reels for communication with said flexible supply means on said reels.

22. The dental equipment stand set forth in claim 21 further characterized by said manifold means being fixedly mounted within said cabinet and said interconnecting conduit means being flexible, said reels also including rotary joints connecting said flexible conduit means to said reels.

23. A dental equipment stand comprising in combination, a cabinet having base means arranged to be supported against vertical movement, a frame supported for vertical movement relative to said cabinet, power means connected to said frame and operable to move it selectively to desired vertical heights above said cabinet, an instrument-supporting carriage carried by the upper portion of said frame for vertical movement therewith, said carriage having a forward face provided with means to support dental instruments and said carriage being adjacent the top of said cabinet when said frame is in its lowest position, a top carried by said frame and covering said carriage, said top being movable from said covering position to provide access to mechanism carried by said carriage, guide means on said frame supporting said carriage for substantially horizontal movement relative thereto, and means within said cabinet operable to move said carriage relative to said guide means and transversely of said cabinet to project said forward face of said carriage laterally relative to the front of said cabinet to dispose instruments carried by said carriage so as to be convenient to the reach of the operator.

24. The dental equipment stand set forth in claim 23 further including antifriction rollers supporting said carriage upon said guide means of said frame for ready lateral movement relative to said frame, said carriage being vertically movable from said frame for inspection and repair when said top is removed and said rollers being capable of supporting said carriage upon said frame when moved from operative position upon said frame.

25. The dental equipment stand set forth in claim 23 further including support means on said carriage, a plurality of reels rotatably supported by said support means, fluid supply means within said cabinet, and means connecting said reels to said fluid supply means, said reels and connecting means being rendered accessible when said top is moved from said covering position thereof.

26. The dental equipment stand set forth in claim 23 further characterized by said means to move said frame vertically comprising mechanisms spaced apart and respectively engaging the opposite sides of said frame, and power means operable to actuate said mechanisms simultaneously, thereby to prevent tilting of said frame and carriage carried thereby and said spacing of said mechanisms providing space below said carriage to accommodate accessory apparatus for use with dental instruments when carried by said carriage.

References Cited by the Examiner
UNITED STATES PATENTS

| | | | |
|---|---|---|---|
| 973,573 | 10/1910 | Sims | 312—209 X |
| 1,649,251 | 11/1927 | Pieper | 32—22 |
| 2,490,694 | 12/1949 | Leutheuser | 312—223 |
| 2,649,345 | 8/1953 | Hubbard | 108—144 |

FOREIGN PATENTS 909,003 10/1962 Great Britain.

RICHARD A. GAUDET, *Primary Examiner.*

R. E. MORGAN, *Examiner.*